United States Patent [19]

Miller

[11] 4,079,463

[45] Mar. 14, 1978

[54] HIGH OUTPUT EXTRUDER SCREW

[75] Inventor: Richard Carson Miller, Hockessin, Del.

[73] Assignee: Hercules Incorporated, Wilmington, Del.

[21] Appl. No.: 772,622

[22] Filed: Feb. 28, 1977

[51] Int. Cl.² .............................................. B29B 1/06
[52] U.S. Cl. ...................................... 366/89; 366/323
[58] Field of Search .................. 259/191, 192, 193, 9, 259/10, 25, 26, 45, 46, 97; 425/207, 208, 209

[56] References Cited

U.S. PATENT DOCUMENTS

| Re. 28,901 | 7/1976 | Kim | 425/208 |
|---|---|---|---|
| 2,744,287 | 5/1956 | Parshall | 425/208 |
| 3,023,456 | 3/1962 | Palfey | 425/207 |
| 3,263,276 | 7/1966 | Maier | 259/191 |
| 3,355,769 | 12/1967 | Fogelberg | 425/207 |
| 3,524,222 | 8/1970 | Gregory | 425/208 |
| 3,826,477 | 7/1974 | Kunogi | 425/208 |
| 3,870,284 | 3/1975 | Kruder | 259/191 |
| 3,949,973 | 4/1976 | Bishop | 259/191 |

Primary Examiner—Robert W. Jenkins
Attorney, Agent, or Firm—Stanley A. Becker

[57] ABSTRACT

A high output extruder screw which produces high throughputs and increased melting efficiency. The screw has a feed, transition and a meter section. The transition section includes a series of alternating compression and relief zones. Each compression zone has a decreasing channel depth and each relief zone has an increasing channel depth. This promotes rapid melting of the polymer while maintaining low extrudate temperatures and allows higher screw speeds to increase throughput.

8 Claims, 6 Drawing Figures

HIGH OUTPUT EXTRUDER SCREW

BACKGROUND OF THE INVENTION

This invention relates to extruder screws for melting, mixing and extruding semi-crystalline polymers at high throughput rates, and particularly to high output extruder screws having a transition section including a series of alternating compression and relief zones with each compression zone having a decreasing channel depth and each relief zone having an increasing channel depth.

Conventional extruders typically have smooth cylindrical barrels fitted with extruder screws having helical channels such that rotation of the screw will advance a granular or powdered plastic toward the discharge end of the extruder. Melting of the plastic is promoted by maintaining the barrel at an elevated temperature, but also, and more effectively, by the mechanical energy provided by rotation of the screw. The efficiency of the melting and conveying or pumping of the plastic is influenced by the design of the extruder screw. The nature of the plastic being extruded also can substantially influence the rate of extrusion, temperature of the extrudate, uniformity of melting, and other parameters.

Most conventional extruder screws include a feed section having a deep constant depth helical channel for the conveying of unmelted solids, a compression or transition section of uniformly decreasing channel depth to assist in melting, and a meter section of constant reduced channel depth to complete polymer melting and control throughput. The extrusion characteristics of an extruder screw can be altered by the selection of the depths of the feed and meter sections and the relative lengths of the feed, transition and meter sections. It has been known that to obtain higher outputs the approach is to use screws having deeper channel depths or use higher screw speeds. However, deeper channel depths decrease melting efficiency and also cause temperature variations resulting from unmelted polymer which limits productivity. The use of higher screw speeds causes undesirably high extrudate temperatures. Conventional extruder screws have limited melting and conveying capacity and when attempting to obtain high throughput rates, melting is often inadequate to obtain a completely melted extrudate. Inadequate melting in the transition section can result in plugging, which is the filling up of the channel with solid materials. Plugging is believed to be a major cause of undesirable surging or pressure fluctuations. It is known that plugging can be avoided by the use of long feed and transition sections or by the use of lower compression ratio screws. The compression ratio is the ratio of the feed channel depth to the meter channel depth. Any of these changes, however, tend to reduce the melting capacity of a screw design.

To improve melting, some extruder screws have been made with mixing devices such as circumferential rows of pins or longitudinal fluted sections with increased flight clearance to pass the melt and trap unmelted material. Such screws, however, are not capable of handling large quantities of unmelted material and thus the mixing devices are located in the meter section, and most desirably, near the end of the meter section close to the discharge end. Consequently, such screws with mixing devices do not promote melting of the material in the transition section.

Other conventional extruder screws used to promote melting are multi-stage screws where the channel depth varies in a cyclic manner in the direction of flow as shown, for example, in U.S. Pat. No. 3,023,456. In such multi-stage screws, there are several feed sections, several transition sections, one or more relief sections and several meter sections. The difficulty with such extruder screws is that the first feed and transition section must be short to permit the use of succeeding ones. The use of such short feed and transition sections causes plugging at high throughput rates. Also, such screws have zones of zero pressure which require regions of high shear to reduce the pressure. This results in high plastic melt temperatures.

Another conventional type of screw using relief zones is the wave screw which has sinusoidal changes in channel depth in only the meter section. This screw uses a conventional feed and transition section and encounters the plugging problems of other conventional screws.

Another conventional type of screw used to improve melting is the melt-drain screw which either uses a double flight to segregate the melt from the unmelted solid or drains the melt into passages within the core of the screw. Such melt-drain screws are expensive to fabricate.

SUMMARY OF THE INVENTION

The subject invention provides an extruder screw including a transition section having a series of alternating compression and relief zones with each compression zone having a decreasing channel depth and each relief zone having an increasing channel depth. This accomplishes melting at a very rapid rate. The screw also preferably has a relatively long feed and a transition section to avoid high shear and consequent overheating of the melt, especially at high screw rotation rates. The feed section of the screw is of normal depth and of sufficient length to produce a pressure in excess of 300 p.s.i., but preferably over 500 p.s.i., at the designed maximum throughput and revolution rate of the screw. This length, when used with a barrel temperature approximately 100° F. above the melting point of the polymer, will cause some significant fraction of the throughput to melt. The transition section has a series of alternating compression and relief zones, preferably with progressively smaller channel depths at the exit end of each compression zone. The depth at the end of each relief zone may be constant, or increasing or decreasing as desired. The highest melting rates are obtainable with the deepest depth possible in the relief zones without compromise of the structural integrity of the screw. The compression zones are designed so as to avoid any significant loss in pressure and to avoid any plugging. The melting efficiency of the screw increases with the number of relief zones utilized. If desired, a short meter section can be fitted with a conventional mixing device, such as a row of mixing pins or a fluted mixer, to insure relatively complete melting in the meter section. The meter section and mixing device are designed so as to permit achievement of the desired throughput rate at the specified screw rotation speed without loss in pressure or consequent overheating of the melt.

Other advantages of the present invention will be apparent from the following detailed description of the invention when considered in conjunction with the following detailed drawings, which drawings form a

DESCRIPTION OF THE INVENTION

Figure 1:
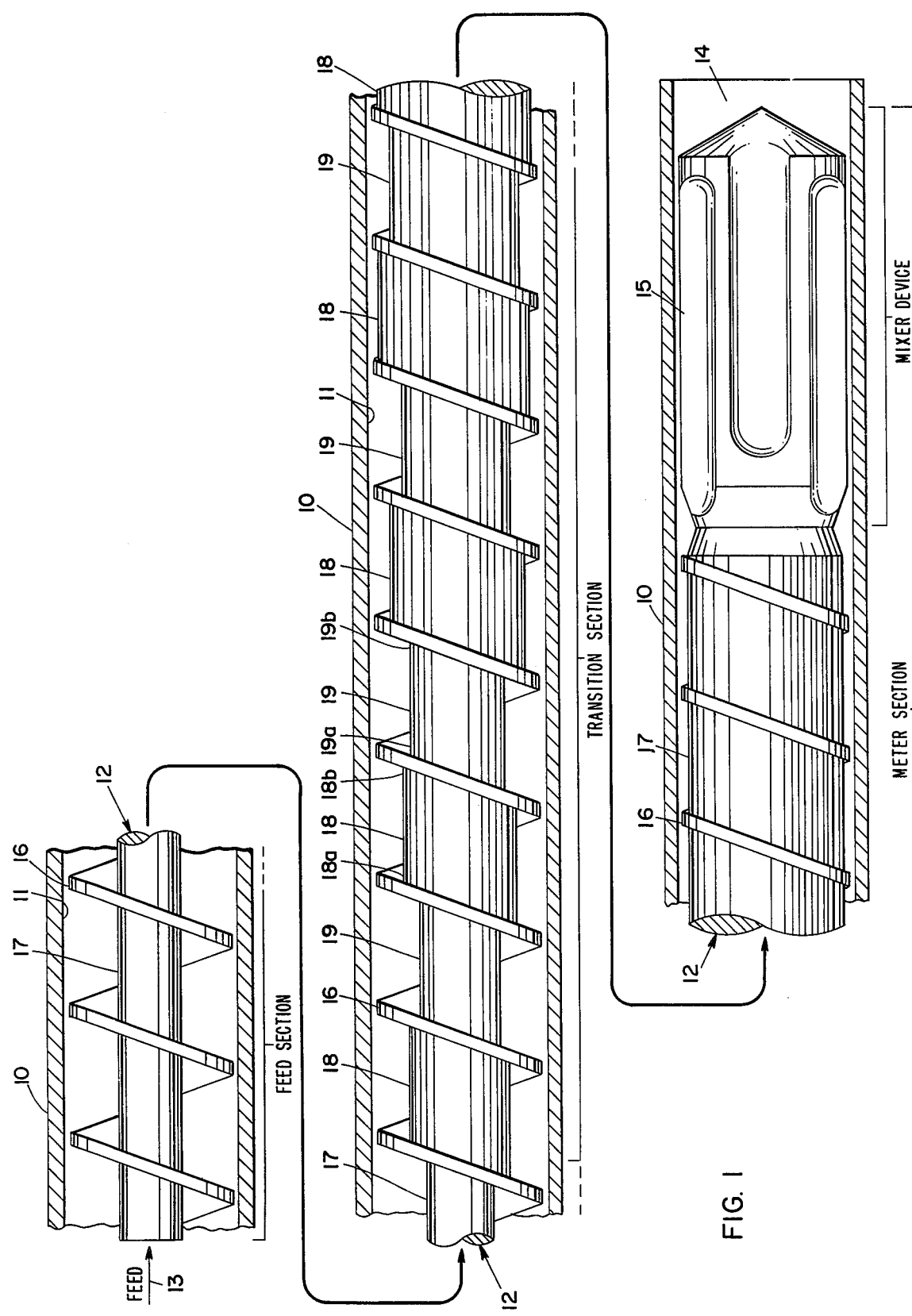
FIG. 1 is a schematic view of a portion of an extruder screw in accordance with this invention with the depth of the channel exaggerated to clearly illustrate the transition section having alternating compression and relief zones.

Referring now to FIG. 1, there is shown a portion of an extruder including a barrel 10 having a longitudinal bore 11 therein for receiving an extruder screw generally designated as 12. The screw 12 is rotatable by conventional drive means (not shown) for moving polymer from the polymer feed end 13 of the extruder to the discharge end 14. The extruder screw 12 has a helical flight 16 of constant outside diameter and a channel 17. The channel 17 varies in depth along the length of the screw 12 in accordance with the principles of this invention. The depths of the channel are exaggerated in FIG. 1 for the purpose of illustrating the unique features of this invention. The extruderscrew 12 has a feed, extruder screw and a meter section as illustrated. Additionally, the screw may also include a mixer device in the meter section or at the end of the meter section, such as fluted mixer 15.

Figure 2:
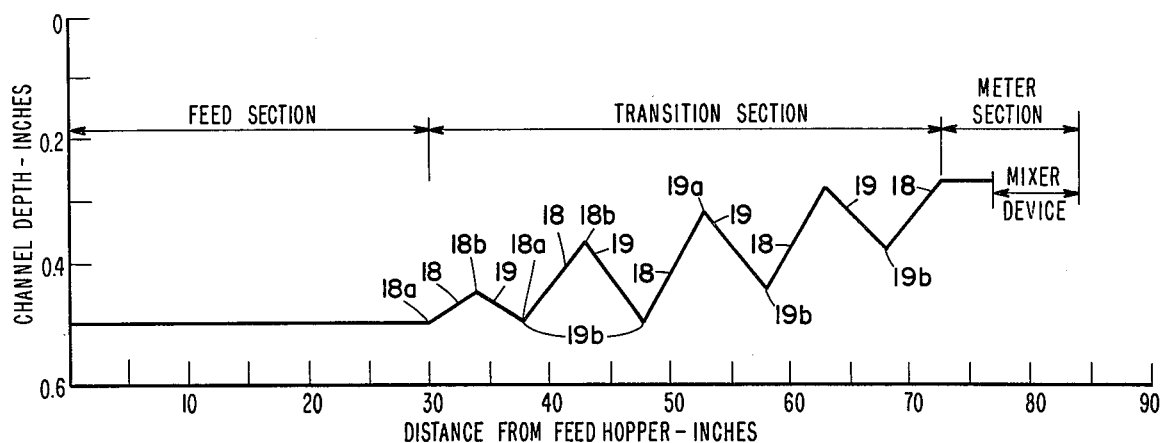
FIG. 2 is a plot of the channel depth of an extruder screw in accordance with this invention as it varies along the length of the screw, illustrating a constant depth feed section, a transition section having alternating compression and relief zones with progressively smaller channel depths at the exit end of each compression zone, and a constant depth meter section.
Figure 3:
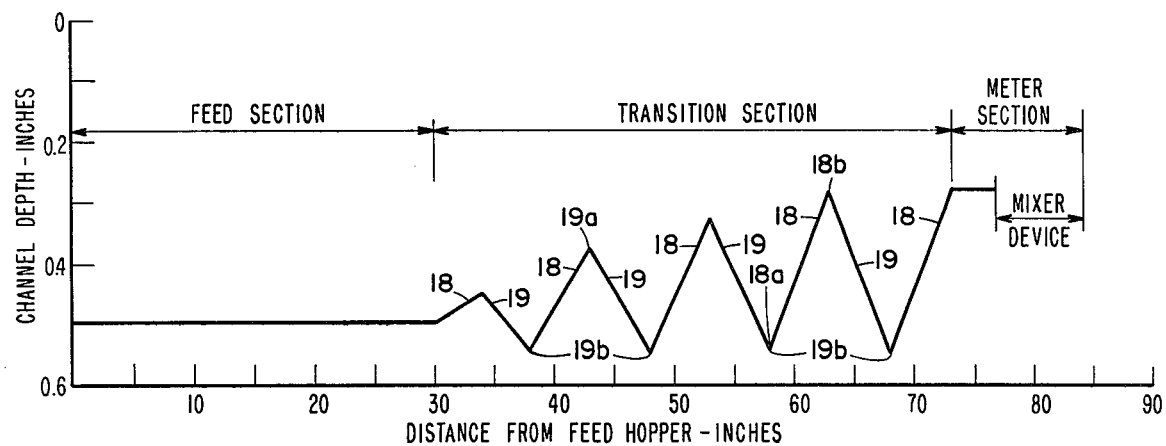
FIG. 3 is a plot of the channel depth of another extruder screw in accordance with this invention as it varies along the length of the screw, illustrating a constant depth feed section, a transition section having alternating compression and relief zones with constant depth at the end of each relief zone.

The transition section of the screw 12 has alternating compression zones 18 and relief zones 19. The channel 17 in each compression zone 18 decreases in depth from the entrance end 18a of the zone 18 to the exit end 18b of the zone. The channel 17 in each relief zone 19 increases in depth from the entrance end 19a of the zone to the exit end 19b of the zone. It has been found that relief zones 19 cause more rapid melting of the polymer than the compression zones. As the number of compression and relief zones is increased, the melting capacity of the screw is increased. Since the shallowest portions of the screw, the exit ends 18b of each compression zone 18 as illustrated in FIGS. 2 and 3, correspond to the channel depth of the transition section of a conventional screw, the relief zones 19 have the effect of substantially increasing the average depth of the channel 17. The deeper channel coupled with the increased melting action of the relief zones tends to produce rapid melting while maintaining low extrudate temperature. Because extrudate temperature remains low, higher screw speeds can be utilized without excessive extrudate temperature, thus increasing throughput.

Referring to FIGS. 2 and 3, there is shown in each a plot of the channel depth of a typical screw in accordance with this invention as it varies along the length of the screw. It is to be noted that each compression zone 18 has a decreasing channel depth from its entrance end 18a to its exit end 18b. The channel depth in each relief zone 19 increases from the entrance end 19a to the exit end 19b. It is clearly shown that the exit end 18b of each compression zone 18 has a progressively decreasing depth. The exit end 19b of each relief zone 19 may remain constant, as shown in FIG. 3, and in the first two relief zones of FIG. 2, may decrease as shown in the other relief zones of FIG. 2, or in some instances, may increase.

Figure 4:
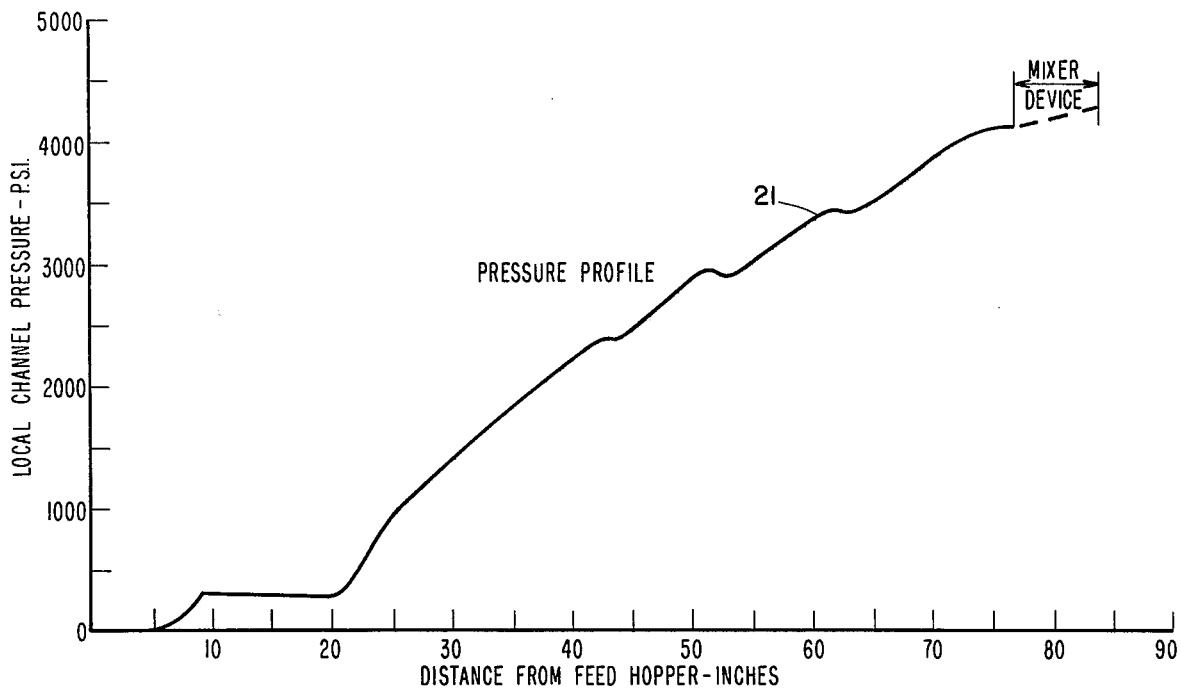
FIG. 4 is a plot of the channel pressure of a typical extruder screw in accordance with the principles of this invention as it varies along the length of the screw.

Referring to FIG. 4, there is shown a plot 21 of the pressure in the channel as it varies along the length of the screw for a typical embodiment of the subject invention. It is to be noted that a screw in accordance with this invention produces a very uniform pressure gradient. There are no large losses in pressure occurring within the screw channel, as is common in two-stage screws. Instead, there are only several minor dips in pressure amounting to less than 100 p.s.i. The absence of severe pressure loss provides relatively low shear to the polymer melt, thus reducing temperature rise of the polymer. Because of the design of the subject screw, any temperature rise in a compression zone would tend to be reduced by transferring heat from the melt to the residual unmelted polymer in the relief zone. Thus, at no place in the screw channel does the melt become excessively heated.

Figure 5:
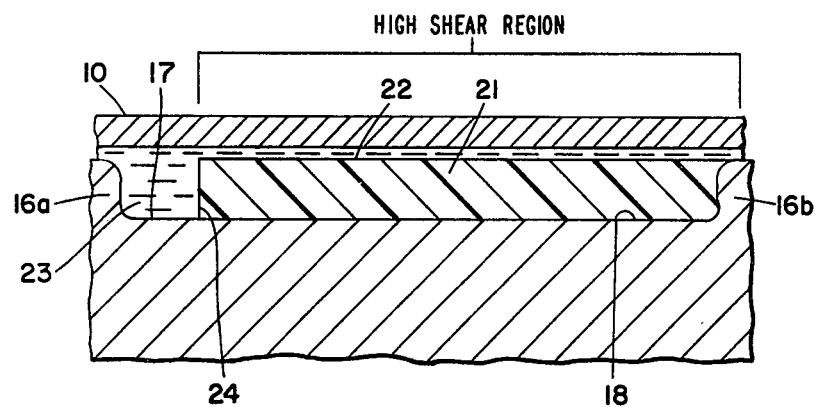
FIG. 5 is an enlarged partial longitudinal cross-section of an extruder screw illustrating the channel and the melted and solid polymer therein in a compression zone.

In operation of the screw, it is believed that in the transition section a solid bed of plastic material is usually confined to the area behind the advancing flight. For example, referring to FIG. 5 wich illustrates a cross-section of channel 17 in a compression zone 18, the solid bed 21 is shown between flight 16a and 16b. At the surface of the barrel 10 is a region of high shear as labeled in FIG. 5 which establishes and maintains a melt film 22 which produces reasonably efficient melting. To the rear of the advancing solid bed 21, but in front of the advancing flight 16a, is the polymer melt 23 which flows through the channel 17 at a rate more rapid than the progress of the solid bed 21. Because there is only a small area 24 where melt is in contact with the solid bed 21 (excluding the melt film 22 which is under high shear), there is little opportunity to transfer heat from the low shear melt 23 to the solid bed 21. As a result, melt temperatures rise in each compression zone.

Figure 6:
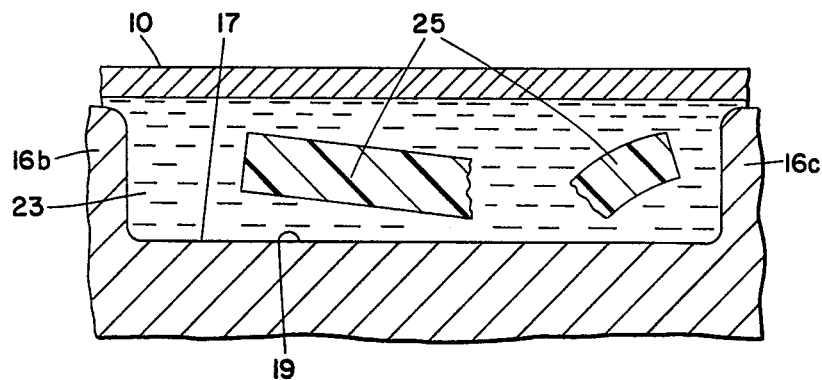
FIG. 6 is an enlarged partial longitudinal cross-section of an extruder screw illustrating the channel and the melted and solid polymer therein in a relief zone.

As shown in FIG. 6, which illustrates a cross-section of channel 17 in a relief zone 19, the solid bed 21 is discharged into the relief zone between flight 16b and 16c. In the relief zones 19, the depth increases with distance while the dimensions of the solid bed do not change. As a result, the solid bed 21 is discharged from the previous compression in the form of a belt 25 which may or may not break up. Melt 23 now has access to the belt 25 from all sides and a modest shear is present from the rotation of the screw which tends to promote convective heat transfer from melt to solid, thus causing rapid melting of the solid belt 25 and substantial cooling of the melt 23. In the next compression zone (not shown), the melt 23 is squeezed away from the solid belt 25 and a new solid bed is formed and the process repeated. Because of this alternate squeezing and relieving, the subject screw has a kneading action which tends to promote mixing and heat transfer.

The specific dimensions for a screw designed in accordance with the principles of this invention may be determined empirically, calculated using conventional equations, or determined by the use of commercially available computer programs.

Having set forth the general nature of the invention, the following examples illustrate some specific embodiments of the invention. It is to be understood, however, that this invention is not limited to the examples, since the invention may be practiced by the use of various modifications.

EXAMPLES

A series of extruder screws were evaluated using a computer program called "EXTRUD" commercially available from Scientific Process and Research Company. Each screw described below was simulated to have a diameter of 3.5 inches and a length of 84 inches, including a 7-inch fluted mixer. The feed section of each was 30 inches and the meter section, including the fluted mixer, was 11 inches. The polymer extruded was a high molecular weight medium impact polypropylene ethylene copolymer (Hercules Incorporated PRO-FAX 7823).

Tables 1 and 2 illustrate comparisons of a 5 compression screw in accordance with this invention as compared to a conventional simple screw with feed, transition and metering sections, and a conventional two-stage screw. The 5 compression screw has five compression zones and four relief zones. The exit ends of the relief zones have a constant depth as illustrated in FIG. 3. This comparison was simulated using screw designs of essentially identical pumping or pressure development capability. All points were normalized to a head pressure of 3000 p.s.i. The Table 1 comparison is a 77 inch screw which is the 84 inch screw discussed above without the 7 inch fluted mixer. Table 2 compares the same screws with each having a 7 inch fluted mixer added to the end. It can be seen that the screw design of this invention is superior to the other designs by reason of significantly less unmelted polymer, lower melt temperature and slightly lower power consumption.

Table 1

| Property | 77 Inch 5 Compression Screw | | 77 Inch Simple Screw | | 77 Inch Two-Stage Screw |
|---|---|---|---|---|---|
| RPM | 100 | 140 | 100 | 140 | 140 |
| Output, lb./hr. | 368 | 493 | 370 | 491 | 490 |
| Pressure, psi. | 3000 | 3000 | 3000 | 3000 | 3000 |
| Melt Temp., ° F. | 459.2 | 463.8 | 488.2 | 502.1 | 495 |
| Percent Unmelted | 3.8 | 4.4 | 19.6 | 22.6 | 17 |
| Horsepower | 35.6 | 53.8 | 36.9 | 55.4 | 58.5 |

Table 2

| Property | 84 Inch 5 Compression Screw | | 84 Inch Simple Screw | | 84 Inch Two-Stage Screw |
|---|---|---|---|---|---|
| RPM | 100 | 140 | 100 | 140 | 140 |
| Output, lb./hr. | 368 | 493 | 370 | 491 | 490 |
| Pressure, psi | 3000 | 3000 | 3000 | 3000 | 3000 |
| Melt Temp., ° F. | 474 | 481.5 | 497 | 513.3 | 508 |
| Percent Unmelted | 0.4 | 0.4 | 8.6 | 10.9 | 8.0 |
| Horsepower | 37.6 | 56.8 | 38.7 | 58.3 | 60 |

Note in Table 1 that at 100 RPM there are essentially identical outputs for the 5 compression screw and the simple screw. However, at those conditions, the melt temperature for the 5 compression screw is 29° higher than the melt temperature of the 5 compression screw. This higher melt temperature exists despite the substantially higher percentage of unmelted polymer discharged by the simple screw. The horsepower requirements are essentially the same. At 140 RPM, the difference in melt temperature is 38° with an even greater disparity in percentage of unmelted polymer discharged. Likewise, the two-stage screw, while better than the simple screw, exhibits similarly higher melt temperatures and a greater percentage of unmelted polymer discharged than the 5 compression screw.

In Table 2, a 7 inch mixer was added to the end of each of the previous screws. The same disparity of melt temperatures and percentage of unmelted polymer discharged exists.

To evaluate the effect of the number of compression zones, three screws in accordance with this invention were tested by computer simulation and compared with each other. Each screw is an 84 inch screw as described above having a 7 inch fluted mixer. The 4 compression screw has four compression zones and three relief zones, the 5 compression screw has five compression zones and four relief zones, and the 9 compression screw has nine compression zones and eight relief zones. Each screw has relief zones wherein the exit ends have progressively decreasing depths. The results of the simulation are shown in Table 3.

Table 3

| Property | 4 Compression Screw | 5 Compression Screw | 9 Compression Screw |
|---|---|---|---|
| RPM | 130 | 140 | 260 |
| Output, lb./hr. | 450 | 485 | 800 |
| Pressure, psi. | 3000 | 3000 | 1956 |
| Melt Temp., ° F. | 470 | 470 | 489 |
| Percent Unmelted | 5.5 | 2.0 | 0.5 |
| Melt Quality | Very Good | Very Good | Very Good |

In Table 3 above, it can be seen that as the number of compression and relief zones increases, higher screw speeds and thus more output can be obtained at a given melt quality without significantly increasing melt temperature. It is suspected that 20 or more compression and relief zones may be useful, but computer simulation and manufacture of such a screw are tedious.

To evaluate the effect of variations in channel depth, two screws in accordance with this invention were tested by computer simulation and the results are shown in Table 4. The 5 compression screw, FIG. 2 design, has a channel varying in depth as shown in FIG. 2. The 5 compression screw, FIG. 3 design, has a channel varying in depth and having a constant depth at the exit end of each relief zone as shown in FIG. 3. The results of the simulation are shown in Table 4.

Table 4

| Property | 77 Inch 5 Compression Screw - FIG. 2 Design | 77 Inch 5 Compression Screw - FIG. 3 Design | 84 Inch 5 Compression Screw - FIG. 2 Design | 84 Inch 5 Compression Screw - FIG. 3 Design |
| --- | --- | --- | --- | --- |
| RPM | 140 | 140 | 140 | 140 |
| Output, lb./hr. | 500 | 500 | 500 | 500 |
| Pressure, psi. | 1807 | 2622 | 1827 | 2620 |
| Melt Temp., ° F. | 462.4 | 463.1 | 480.8 | 480.8 |
| Percent Unmelted | 8.4 | 4.5 | 1.7 | 0.5 |
| Horsepower Consumed | 54.1 | 53.9 | 47.1 | 56.9 |

Table 4 illustrates that the deeper the channel at the exit end of the relief zones, as in the FIG. 3 design screw, the better the melting capacity of the screw. Thus, the FIG. 2 design screw, which has shallower channel depth at the exit ends of the relief zones, does not have the melting capacity of the FIG. 3 design screw, which has greater channel depth at the exit end of the relief zones. Table 4 further illustrates that the FIG. 3 design screw with the deeper channel provided almost 50% less unmelted polymer discharged than the FIG. 2 design screw. Additionally, the FIG. 3 design screw shows higher pressure generation at the same screw speed and throughput which indicates a more efficient pumping screw.

It is to be understood that the above-described embodiments of the invention are merely illustrative of applications of the principles of this invention and that numerous other arrangements and modifications may be made within the spirit and scope of the invention.

What I claim and desire to protect by Letters Patent is:

1. An extruder screw comprising an elongated member having a helical channel formed therein and a constant diameter flight, said member having a feed section at one end, a meter section at the other end, and a transition section intermediate thereof, said transition section having a series of alternating compression zones and relief zones, each compression zone having a channel depth which decreases from the entrance end of said compression zone to the exit end of said compression zone, and each relief zone having a channel depth which increases from the entrance end of said relief zone to the exit end of said relief zone.

2. An extruder screw as set forth in claim 1 wherein the exit end of each compression zone as it approaches the meter section of said screw is of progressively decreasing depth.

3. An extruder screw as set forth in claim 2 wherein the exit end of each relief zone is of progressively decreasing depth.

4. An extruder screw as set forth in claim 2 wherein the exit end of each relief zone is of progressively increasing depth.

5. An extruder screw as set forth in claim 1 wherein the depth at the exit end of each relief zone is substantially constant.

6. An extruder screw as set forth in claim 1 wherein the exit end of each relief zone is of progressively decreasing depth.

7. An extruder screw as set forth in claim 1 wherein the exit end of each relief zone is of progressively increasing depth.

8. An extruder screw as set forth in claim 1 including a mixer added to the end of said meter section.

* * * * *